United States Patent
Kruy et al.

(10) Patent No.: US 7,406,523 B1
(45) Date of Patent: Jul. 29, 2008

(54) CLIENT-SERVER COMMUNICATIONS SYSTEM AND METHOD USING A SEMI-CONNECTIONLESS PROTOCOL

(75) Inventors: Steven J. Kruy, Carnation, WA (US); Christopher G. Kaler, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1080 days.

(21) Appl. No.: 09/717,674

(22) Filed: Nov. 21, 2000

(51) Int. Cl.
*G06F 15/16* (2006.01)
(52) U.S. Cl. ............... 709/227; 709/203; 709/219
(58) Field of Classification Search ............ 709/206, 709/201–203, 216–220, 227–232
See application file for complete search history.

(56) References Cited

U.S. PATENT DOCUMENTS

| | | | | |
|---|---|---|---|---|
| 5,241,675 A * | 8/1993 | Sheth et al. ............. | 707/8 |
| 5,504,900 A * | 4/1996 | Raz ..................... | 707/10 |
| 5,608,870 A * | 3/1997 | Valiant ................. | 711/100 |
| 5,680,610 A * | 10/1997 | Smith et al. ............ | 707/10 |
| 5,774,660 A * | 6/1998 | Brendel et al. .......... | 709/201 |
| 5,920,863 A * | 7/1999 | McKeehan et al. ........ | 707/10 |
| 6,098,108 A * | 8/2000 | Sridhar et al. .......... | 709/239 |
| 6,182,139 B1 * | 1/2001 | Brendel ................. | 709/226 |
| 6,275,843 B1 * | 8/2001 | Chorn .................. | 718/101 |
| 6,442,552 B1 * | 8/2002 | Frolund et al. .......... | 707/10 |
| 6,446,225 B1 * | 9/2002 | Robsman et al. ......... | 714/55 |
| 6,574,627 B1 * | 6/2003 | Bergadano et al. ....... | 707/9 |
| 6,718,390 B1 * | 4/2004 | Still et al. ............ | 709/229 |
| 6,754,709 B1 * | 6/2004 | Gbadegesin ............. | 709/227 |
| 6,785,722 B2 * | 8/2004 | Vuong et al. ........... | 709/223 |

OTHER PUBLICATIONS

RFC 793, Sep. 1981.*

* cited by examiner

*Primary Examiner*—Glenton B. Burgess
*Assistant Examiner*—Yasin M Barqadle
(74) *Attorney, Agent, or Firm*—Woodcock Washburn LLP

(57) ABSTRACT

A system and method for performing client-server transactions includes an application interface, located at a client, which manages connections between the client and a server. The application interface receives a request from an application program, opens a connection with the server, sends a message that includes the request over the connection, and holds the connection open for at least a timeout period. If the application interface receives another request destined for the server during the timeout period, it sends another message with the new request over the open connection. If the application interface receives one or more requests that are part of a transaction, the application interface assigns a transaction identifier to the transaction. The transaction identifier and a sequence indicator are included in each message with each request. At the server, a transaction manager receives the messages, sequences the requests based on the sequence indicators, and processes the requests in the indicated sequence. If the application interface receives a redirect request from the server in response to a message, the application interface sends the message to another server identified in the redirect request without involving the client application.

19 Claims, 8 Drawing Sheets

CLIENT-SERVER COMMUNICATIONS SYSTEM AND METHOD USING A SEMI-CONNECTIONLESS PROTOCOL

TECHNICAL FIELD

The invention relates generally to protocols between client and server computers and, more particularly, to managing transactions between a client and a server by an application interface and a server transaction manager.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright© 1998, Microsoft Corporation, All Rights Reserved.

BACKGROUND OF THE INVENTION

A typical distributed computer system, as illustrated in FIG. 1, includes multiple client computers 102 which ask one or more generic application servers 104 to provide various services. These requests may ask the server to provide many types of services. For example, a request may ask the server to authenticate a user, provide access to files or data, send or receive email, or provide Web access.

To start the process, a client 102 sends one or more requests to the server 104 over a connection 108 between the client and the server. The server then fulfils the request, which, in some cases, may involve obtaining data over one or more connections 110 to various databases 106.

A client request can be generated, for example, by a Web browser or some other application. The client request is then sent by the client computer to the server using a protocol that is specific to the type of system. Generally, the system supports a protocol that is either a "connection-full" or a "connectionless" protocol.

Using a connection-full protocol, a client makes a connection to the server, and that connection can be maintained throughout multiple message exchanges between the client and server. Even through periods of idleness, when no messages are being exchange, the client and server maintain the connection.

One advantage to using a connection-full protocol is that the client is guaranteed a connection resource when the client has a message to send to the server. In addition, it is easier for the server to keep track of which messages are associated with which client, and the state of the client application. A disadvantage to using a connection-full protocol, however, is that the semi-permanent connections inefficiently consume server resources. Even though the channel may be idle (i.e., the client and server are not exchanging any information), the server must expend resources to maintain the channel and information relating to the client, thus making those resources unavailable to other clients.

Hyper Text Transfer Protocol (HTTP) is an example of a connectionless protocol that is commonly used in Internet applications. Using a connectionless protocol, each time a message needs to be transferred between the client and the server, a connection is established, the message is transferred, and the connection is terminated.

One advantage to using a connectionless protocol is that the available server resources are more efficiently utilized. Essentially, server resources relating to client-server communications are consumed only when information needs to be transferred between the client and server. One disadvantage to using a connectionless protocol, however, is that the connection establishment and termination process must be performed for each message that needs to be exchanged. In addition, client state information (e.g., authentication information) often needs to be passed to the server again.

Often, a client would like the server to perform multiple, related actions. For example, a client may ask a server to alter multiple records stored in a particular database table. In some systems, these multiple actions are managed using "transaction processing," which is a technique for processing a set of related requests. Specifically, a "transaction" is a way of grouping a set of requests so that all requests are either completed or all requests fail. For example, the requests could be to perform an input/output (I/O) operation, requests to update a screen, or requests to store or retrieve data to memory, tape, or a database. In the context of database transactions, transaction processing enables modifications to a database to be controlled so that system failures do not affect the correctness or integrity of the database.

Using transaction processing, the separate operations that comprise the transaction must be executed atomically, meaning that once the transaction begins to execute, all of its operations must be completed. If a failure interrupts the transaction, the part of the transaction that has been completed must be rolled back. The rollback process returns the system to a previously known and consistent state, as if the transaction had never occurred. If a transaction is completed, the changes are "committed," and if the transaction is interrupted or explicitly cancelled, it is considered to be "aborted."

Transaction processing has several advantages. First, the atomicity characteristic of a transaction means that each transaction is treated as all-or-nothing. If a transaction commits, all of its requested effects remain. If a transaction aborts, no requested changes are made to the system. For example, if a transaction relates to modifying a database, the database will not include partial modifications that make the database records inconsistent.

Some systems enable transactions to be "isolated" from each other, meaning that updates of concurrent, incomplete transactions are separated from each other. Thus, for example, other clients will not see the changes to database records until those changes are committed. This isolation characteristic also means that database manipulation in the context of a transaction enables the client to keep a coherent view of the database. Thus, the database will not appear to change once a client has opened a transaction. Although isolation is not a requirement of a transaction, many systems provide it, often providing multiple levels of isolation.

Using a connectionless protocol, separate messages that comprise a particular transaction could come into the server out of order, in some cases. This may occur, for example, when multiple client threads are issuing requests within the context of a single transaction, or if an unreliable protocol is being used. Generally, prior art transaction managers are unable to handle out of order requests.

In some system architectures, data can be referenced at different server locations. For example, certain data may have been moved, and the server that initially provided access to that data maintained the data's forwarding address. In these circumstances, when the server receives a request for that data, the server can issue a redirect message to the client, indicating that the data is accessible to another server (i.e., at the forwarding address). HTTP is an example of a protocol that offers redirect services.

In prior art systems, these redirect messages are handled by the client application, such as the client's Web browser. After receiving the message, the application must either send a new request to the appropriate server, or must fail the request. Thus each application must include the ability to handle these redirect messages, placing an additional burden on application designers.

A server may need to redirect one or more, but not all, requests that are made in the context of a transaction. These redirect requests in the context of transactions are not well handled by prior art systems.

What is needed is a system and method that has the advantages of both a connectionless and a connection-full protocol, without the accompanying disadvantages. Specifically, what is needed is a system and method that efficiently uses server resources, without requiring a connection to be established and terminated each time a message needs to be transferred. Further needed is a system and method that enables transaction processing to be performed even when the server receives the transaction's requests out of order. Further needed is a system and method for a client computer to handle redirect requests without involving the associated client application, including the ability to handle redirect requests in the context of a transaction.

SUMMARY OF THE INVENTION

A method for performing a transaction in a computer system utilizes an application interface on the client side, and a transaction manager on the server side. The application interface receives a request from an application program. When the request is part of a transaction, the application interface associates a transaction identifier with the request. The application interface also associates a sequence indicator to the request, where the sequence indicator indicates in what sequence the server should process the request within the context of the transaction. The application interface forms a message that includes the transaction identifier, the sequence indicator, and request, and sends the message to the appropriate server.

In order to send the message, the application interface must have an open connection to the server. If there is no open connection, the application interface opens one. When the application interface determines that no active communication exists between the client and server on an open connection, the application interface will start measuring a timeout period, in one embodiment. When the timeout period has expired, the application interface closes the connection. If other requests for the same server are received before the timeout period expires, the application interface sends the requests over the open connection, and resets the timeout period.

The server receives the message, and processes the request in the context of the identified transaction, and in the sequence indicated by the sequence indicator. If the request is a database request, and the database requires one connection per transaction, the server allocates a database connection to the transaction, and processes the requests in the indicated sequence over that database connection.

The application interface receives a reply from the server in response to the request. If the application interface determines that the reply includes a redirect request that indicates that the request should be sent to another server, the application interface sends the request to the other server, without involving the application that initially issued the request.

A computer system houses an application interface and a transaction manager that perform the above-described method. In addition, a computer-readable medium holds computer executable instructions for performing the above-described method.

DETAILED DESCRIPTION

Embodiments of the present invention provide a system and method that efficiently uses available bandwidth between a server and multiple clients, without requiring a connection to be established and terminated each time a message needs to be transferred. In one embodiment, this is accomplished by using a "semi-connectionless" protocol between a client and server. The semi-connectionless protocol is managed, in part, by an application interface located on the client side. When a message needs to be transferred, a connection is opened. Rather than immediately terminating the connection when the message has been transferred, however, the application interface holds the connection open for a timeout period, measured from the time of the last transferred message. During this timeout period, other messages may be exchanged over the connection. If the timeout period expires without any other message transfers, the connection is terminated. The connection also may be terminated by the server if there are no active requests on the connection, or if the server needs the connection for another purpose.

Embodiments of the present invention also provide a system and method that enables transactions to be implemented in the communications between a client and a server, thus enabling the client to start a transaction, request that the server perform certain operations, and commit or abort the transaction without having to maintain a connection to the server for the entire lifetime of the in-progress transaction. In one embodiment, transaction processing is managed by a transaction manager that sequences commands from a client that have been designated as being part of a transaction. This is accomplished by associating a transaction identifier and ordering information with each client-generated command. In one embodiment, an application interface formats the messages that include these transaction-oriented commands.

Embodiments of the present invention also provide a system and method for a client computer to handle redirect requests without involving the associated client application. In one embodiment, this is accomplished by using an application interface to receive the redirect requests from a server, and redirect those redirect requests to another appropriate server.

After describing, in conjunction with FIG. 2, an example of an operating environment in which the invention may be practiced, a system and method for performing client-server transactions using a semi-connectionless protocol in accordance with various embodiments will be discussed in detail in conjunction with FIGS. 3-8.

Operating Environment Example

Figure 1:
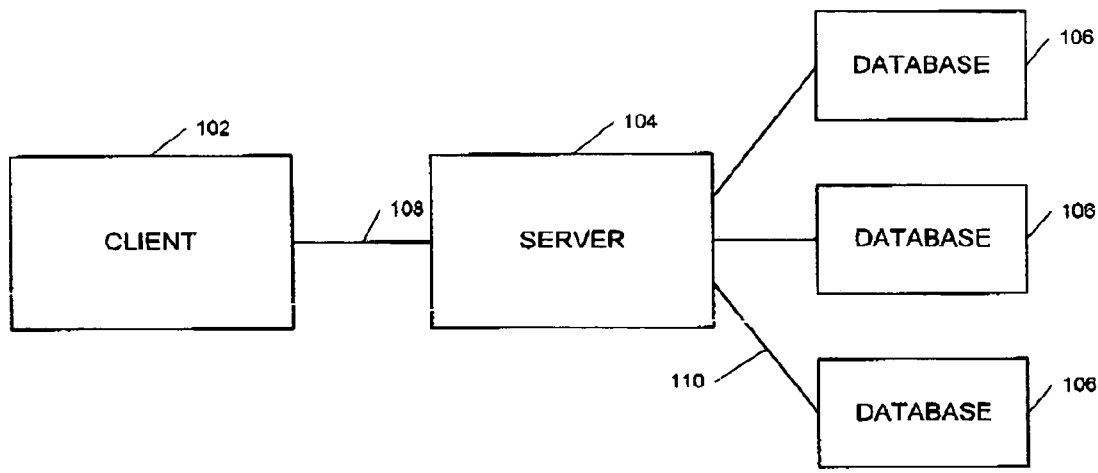
FIG. 1 illustrates a simplified block diagram of a typical distributed communication system in accordance with the prior art.
Figure 2:
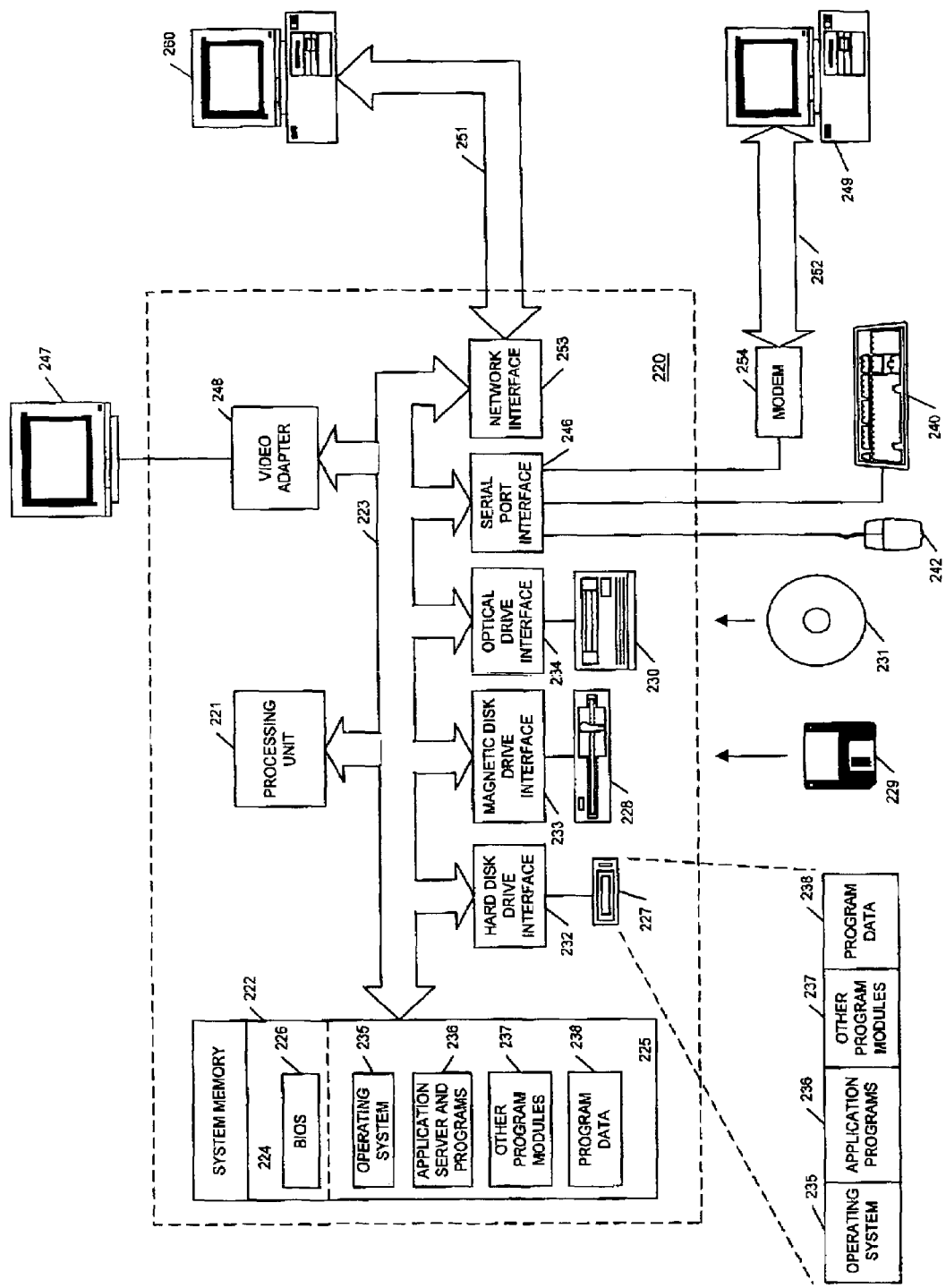
FIG. 2 illustrates block diagram of an operating environment in which the present invention can be practiced in accordance with one embodiment.

FIG. 2 illustrates a block diagram of a computer system in accordance with one embodiment of the present invention. FIG. 2 and the following discussion are intended to provide a brief, general description of a suitable computing environment in which the invention may be implemented. Although not required, the invention will be described in the general context of computer-executable instructions, such as program modules, being executed by a computer. Generally, program modules include routines, programs, objects, components, data structures, etc., which perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The system shown in FIG. 2 includes a general purpose computing device in the form of a computer 220, including processing unit 221, a system memory 222, and a system bus 223 that couples various system components including the system memory 222 to processing units 221. In one embodiment, computer 220 may include only a single processing unit 221, or may include multiple processing units 221 upon which work is distributed.

The system bus 223 may be any of several types of bus structures including a memory bus or memory controller, a peripheral bus, and a local bus using any of a variety of bus architectures. The system memory includes read only memory (ROM) 224 and random access memory (RAM) 225. A basic input/output system 226 (BIOS), containing the basic routines that help to transfer information between elements within the computer 220, such as during start-up, is stored in ROM 224.

The computer 220 further includes a hard disk drive 227 for reading from and writing to a hard disk, not shown, a magnetic disk drive 228 for reading from or writing to a removable magnetic disk 229, and an optical disk drive 230 for reading from or writing to a removable optical disk 231, such as a CD ROM or other optical media. The hard disk drive 227, magnetic disk drive 228, and optical disk drive 230 are connected to the system bus 223 by a hard disk drive interface 232, a magnetic disk drive interface 233, and an optical drive interface 234, respectively.

The drives and their associated computer-readable media provide nonvolatile storage of computer readable instructions, data structures, program modules and other data for the computer 220. Although the exemplary environment described herein employs a hard disk, a removable magnetic disk 229, and a removable optical disk 231, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment. A number of program modules and data structures may be stored on the hard disk, magnetic disk 229, optical disk 231, ROM 224 or RAM 225, including an operating system 235, application programs 236, other program modules 237, and program data 238.

A user may enter requests and information into the computer 220 through input devices, such as a keyboard 240, pointing device 242, or other input devices (not shown). These and other input devices are often connected to processing units 221 through a serial port interface 246 that is coupled to the system bus, but may be connected by other interfaces, such as a parallel port, game port or a universal serial bus (USB). A monitor 247 or other type of display device is also connected to the system bus 223 via an interface, such as a video adapter 248. In addition to the monitor, computers typically include other peripheral output devices (not shown), such as speakers and printers.

The computer 220 may operate in a networked environment using logical connections to one or more remote computers, such as a remote computers 249, 260. Computer 220 and remote computers 249, 260 may be clients, servers, routers, network PCs, peer devices or other common network nodes. Remote computers 249, 260 typically include many or all of the elements described above relative to the computer 220. The logical connections depicted in FIG. 2 include a local area network (LAN) 251 and a wide area network (WAN) 252. Such networking environments are commonplace in offices, enterprise-wide computer networks, intranets, and the Internet.

When used in a LAN networking environment, the computer 220 is connected to the local network 251 through a network interface or adapter 253. When used in a WAN networking environment, the computer 220 typically includes a modem 254 or other means for establishing communications over the WAN 252. The modem 254, which may be internal or external, is connected to the system bus 223 via the serial port interface 246. In a networked environment, program modules depicted relative to the computer 220, or other portions thereof, may be stored in the remote memory storage device. It will be appreciated that the network connections shown are exemplary and other means of establishing a communications link between the computers may be used.

Those of skill in the art will understand, based on the description herein, that numerous system configurations could be used to implement the method of the present invention. Accordingly, all such configurations are intended to fall within the scope of the present invention.

Distributed Computer System and Method of Operation

Figure 3:
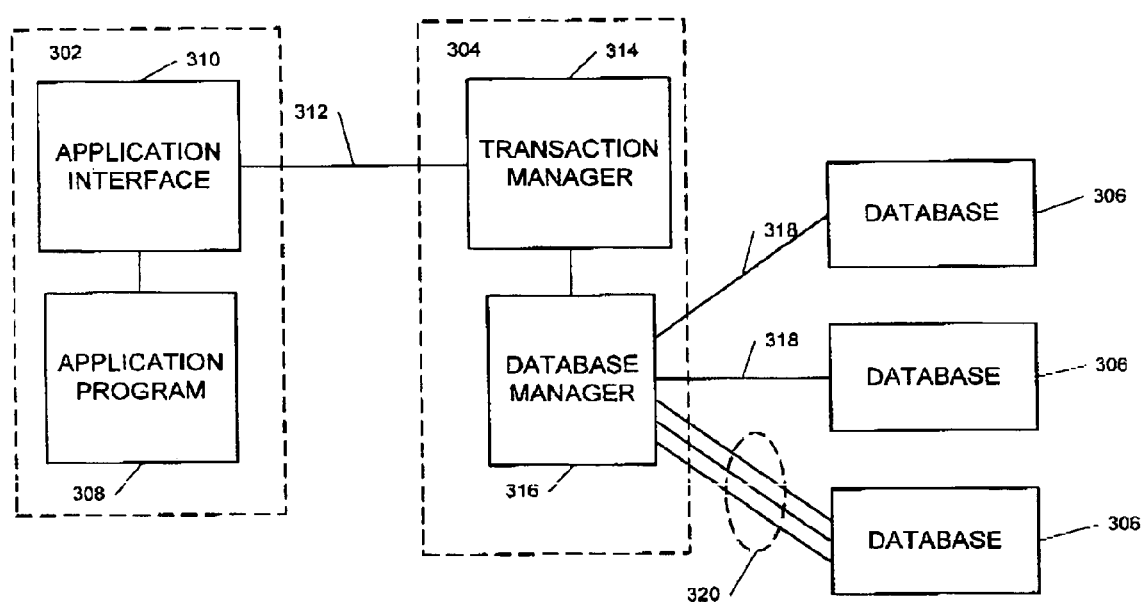
FIG. 3 illustrates a simplified block diagram of a distributed computer system in accordance with one embodiment of the present invention.

FIG. 3 illustrates a simplified block diagram of a distributed computer system in accordance with one embodiment of the present invention. The system includes one or more clients 302 and servers 304. In some embodiments, where the server 304 provides database access, the system may also include one or more databases 306.

In one embodiment, client 302 includes one or more application programs 308 and an application interface 310. All communications between application programs 308 and server 304 (or servers) are abstracted through application interface 310, in one embodiment. Application interface 310 provides automatic redirect of requests, when necessary. The functionality of application interface 310 in the context of the present invention is discussed in detail in conjunction with FIGS. 4-6.

Application interface 310 and server 304 communicate over one or more connections 312, which could be LAN, WAN, or other types of connections. In one embodiment, as is described in detail below, application interface 310 and server 304 communicate using a connection-less protocol. This means that the client and server are not required to have a dedicated connection. In addition, in one embodiment, the client includes a transaction identifier with each request, so that multiple simultaneous transactions can be active on an existing connection. The client also includes sequence information with each request, in one embodiment, to indicate the order that each request falls within the sequence of a particular transaction.

Some prior art systems that support transactions may include a server-based transaction manager, which provides certain facilities for performing transactions. For example a transaction manager using "SQL SERVER" technology coordinates transaction logging, among other things. Logging involves maintaining a log for each transaction, where each log includes "before and after" images of the database's data, in one embodiment. In another embodiment, logging does not use "before and after" images, but uses other methods that would be obvious to one of skill in the art based on the description herein. This enables a transaction to be rolled back, if necessary. In addition, the transaction manager handles transactions that cross databases within the same server.

Server 304 includes a transaction manager 314, in one embodiment. In one embodiment, the transaction manager 314 includes additional functionality that is not provided by prior art transaction managers. Specifically, transaction manager 314 sequentially orders transaction requests that arrive at the server, based on the transaction identifier and sequence information included in each request.

In addition, when a transaction involves database access, the transaction manager works with a database manager 316 to allocate database connections to transactions, in one embodiment. With each database, the database manager 316 can have a single connection 318, or a pool of connections 320. The functionality of server 304 in the context of the present invention is discussed in detail in conjunction with FIGS. 7-8.

Figure 4:
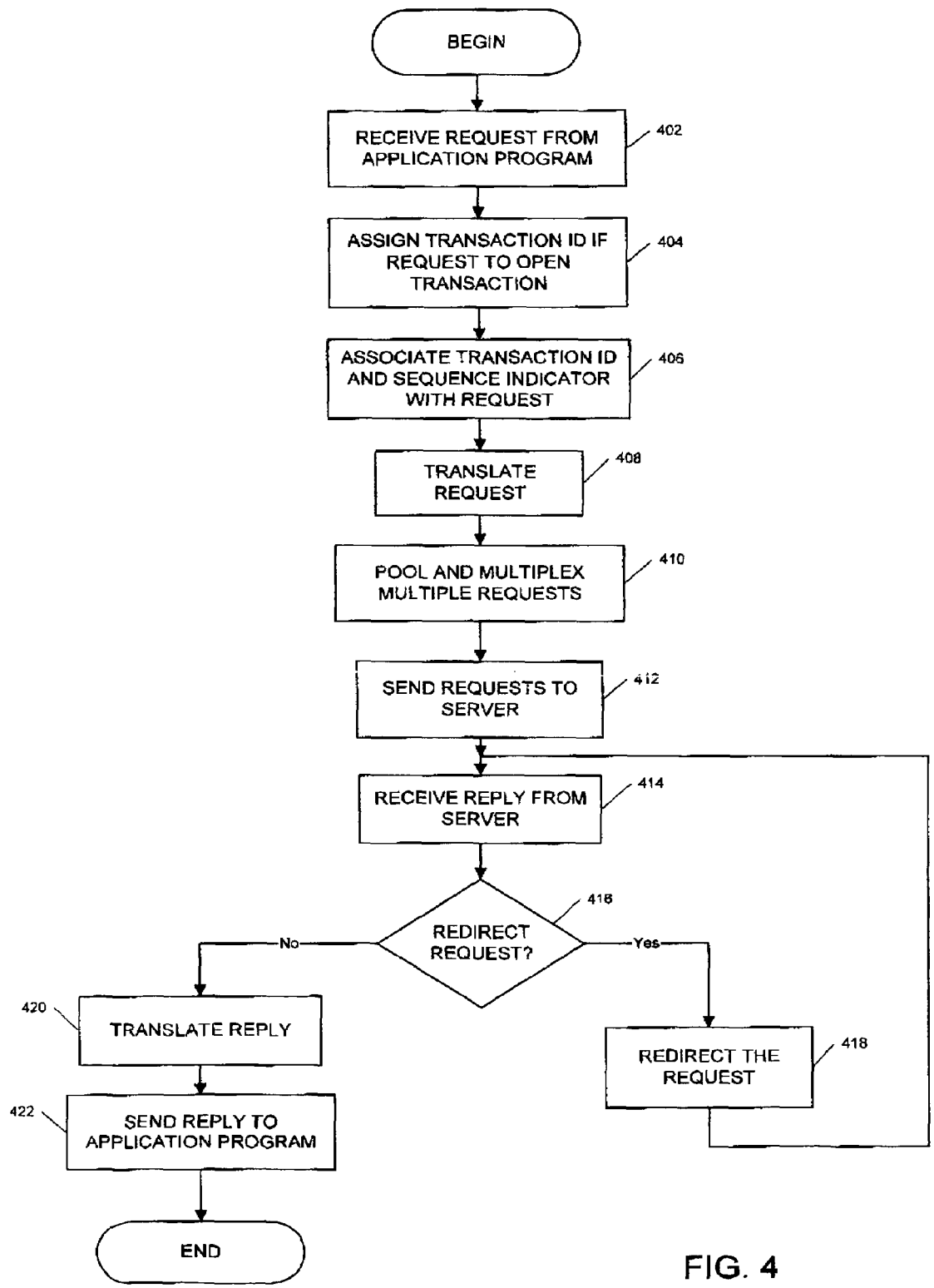
FIG. 4 illustrates a flowchart of a method for exchanging messages between a client and a server in accordance with one embodiment of the present invention.

FIG. 4 illustrates a flowchart of a method for exchanging messages between a client and a server in accordance with one embodiment of the present invention. In accordance with one embodiment, messages from the client are generated by one or more client application programs. Rather than sending these messages directly to the server, the application programs send the messages to an application interface, which in turn sends the message to the server.

The method begins, in block 402, when the application interface receives a request from an application program. A request could be, for example, a request for a server to open a transaction, to commit or abort a transaction, to get a file, to check out a file, to check in changes to one or more records of a database table, or some other arbitrary request or business logic or database function.

If the request is a request to open a transaction, the application interface assigns a transaction identifier (ID) to the transaction, in block 404. The transaction ID is a value that can be used by the application interface and the server to uniquely identify requests that form a part of a particular transaction. In an alternate embodiment, the transaction ID could be assigned by the server. However, this would involve a separate request to be exchanged between the client and the server, and further communication relative to the transaction would have to be delayed until the server assigned and sent the transaction ID to the client.

In addition, if the request is part of a particular transaction, the application interface associates the transaction ID and a sequence indicator with the request, in block 406. The sequence indicator is a value that indicates where the request fits within the sequence of the transaction. In one embodiment, the sequence indicator is an integer number that starts at "1" for the first request in a transaction, then is incremented for each subsequent request in the same transaction. As mentioned previously, multiple threads may issue requests within the context of a single transaction, resulting in a sequence of potentially out of order requests for that transaction. Because multiple threads may issue requests within a particular transaction, the sequence indicator is serialized across these threads, in one embodiment.

In block 408, the application interface translates the request into one or more messages, which can be in the form of network packets, local RPC, shared memory request, or other formats. In one embodiment, each message includes the transaction ID, sequence indicator, request size, a request type identifier, and a block of request specific data. The request size indicates the number of bytes in the request, and the request type identifier indicates the type of request. In addition, in one embodiment, the message includes security information, such as an authentication token and a checksum, for example. In various embodiments, the checksum could be cryptographically signed or the entire request body could be encrypted.

Different elements of client code, may send requests to the application interface within a short time of each other. In one embodiment, the application interface pools and multiplexes multiple requests that are destined for the same server, in block 410. These requests may be associated with one or more transactions. Therefore, a particular multiplexed request may include requests associated with multiple transactions, and this multiplexed request can be sent to the server over a single connection. In another embodiment, the application interface does not pool or multiplex requests, but sends each request to the server separately.

In one embodiment, a transaction ID that identifies a particular transaction is associated with each request within the transaction, in contrast to prior art systems where the transaction is associated with a particular connection to the server. Thus, the present invention enables any server connection to be used for multiple requests and multiple simultaneous transactions.

In block 412, the multiplexed requests are sent to the server. In one embodiment, the requests are sent to the server using a "semi-connectionless" protocol, as will be described in more detail in conjunction with FIG. 5. Also, in one embodiment, the requests are sent using a TCP/IP protocol, which is commonly used in network communications. Different protocols, such as HTTP, XML, and others, could be employed in other embodiments.

The application interface then waits for a reply from the server regarding the transmitted requests. If a reply is not received within a certain amount of time, the application interface would consider the request failed, and could re-send the request or inform the application program that the request failed. In one embodiment, the application is not stalled while the application interface is waiting for the reply. In such an embodiment, the application interface operates asynchronously, and the application is informed when the request is completed. In this embodiment, the application can issue multiple requests on the same transaction without waiting for previously issued requests to complete. In another embodiment, the application interface could operate synchronously, and block the application while the request is pending.

Assuming the server successfully fulfilled the request and sent a reply, the application interface will receive the reply, in block 414. The reply can be in the form of a network packet, a local RPC, a shared memory request, or some other format. In one embodiment, the reply includes the same transaction ID and sequence indicator as the request that yielded the reply. In addition, the reply includes data that satisfies the request.

In one embodiment, a determination is then made, in block 416, whether the reply includes a redirect request. The server will send a redirect request in response to a request when the server cannot fulfill the request, but knows that a different server can. Redirect requests can be issued for a variety of different types of client requests, including Web-related requests and database-related requests. For example, if a request asks a first server for some specific data, and the requested data is known to be accessible by a second server, the first server will send a redirect request, indicating that the client should look to the second server for the data. In some cases, when the server asks the database manager for the data, the database manager may inform the server that the data is stored elsewhere. If the database manager notifies the server that the data is stored elsewhere, the server sends the redirect request as a reply to the application interface.

If the reply includes a redirect request, then the application interface sends the original request to the other server identified in the redirect request in block 418. In one embodiment, the application interface also stores or caches the redirect information, so that subsequent requests of this type to this resource can be directed to the correct server initially. The application interface then waits for a reply from that server, and the procedure iterates as shown in FIG. 4.

If the reply does not include a redirect request, but instead includes the requested data or other information, then the application interface translates the reply, in block 420, into a format that is understood by the requesting application program. The application interface then sends the translated reply to the client, in block 422, and the method ends.

Figure 5:
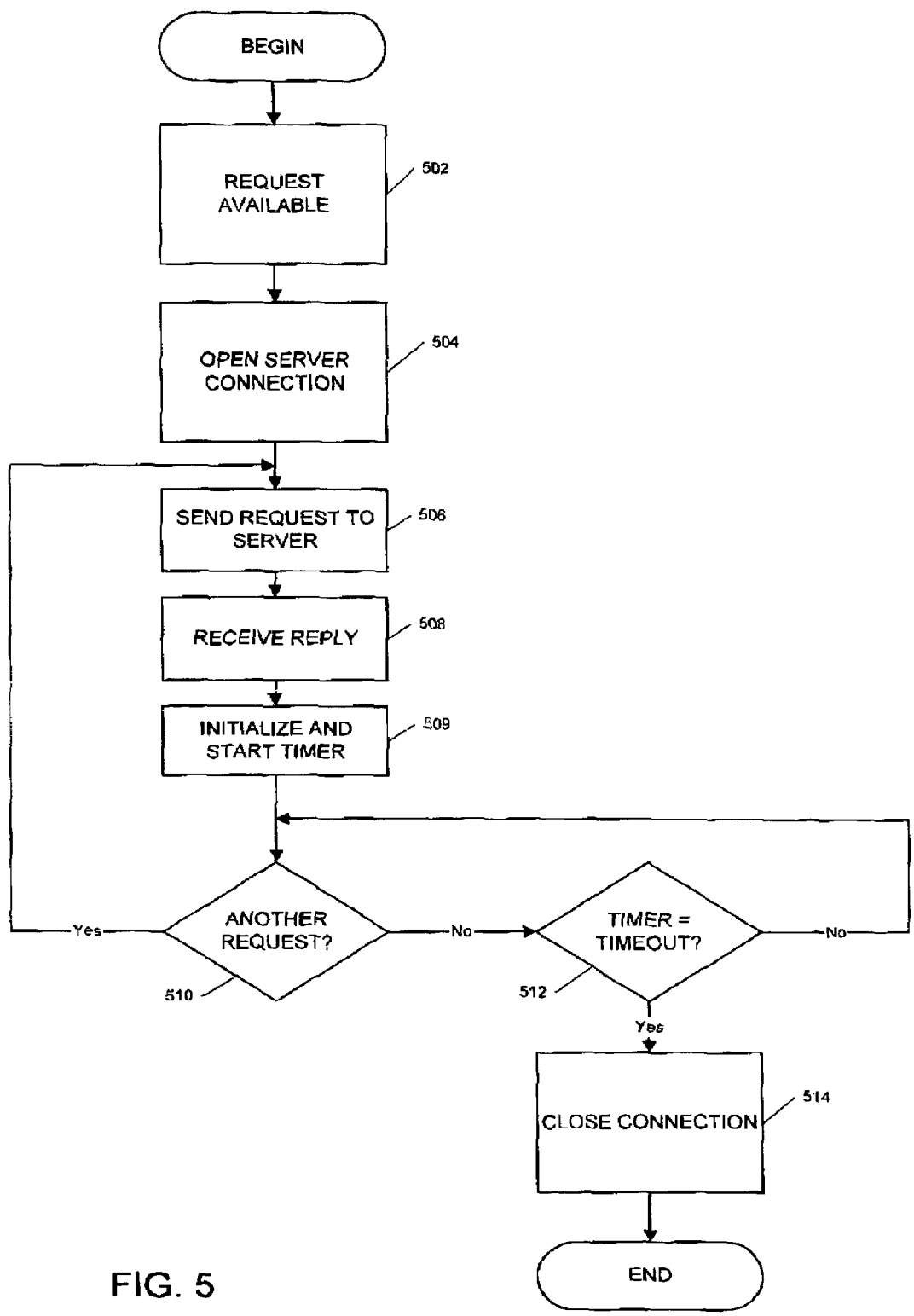
FIG. 5 illustrates a flowchart of a method for sending a request to a server by a client in accordance with one embodiment of the present invention.

As described in conjunction with block 412 of FIG. 4, the application interface uses a semi-connectionless protocol when sending requests to the server. FIG. 5 illustrates a flowchart of a method for sending a request to a server by a client in accordance with one embodiment of the present invention. In this embodiment, the application interface uses a "semi-connectionless" protocol when communicating with the server. This means that, after the application interface has opened a connection with the server and transmitted a first message, the application interface will then keep the connection open for a certain period of time before closing the connection. If the application interface receives any other requests destined for the server during that time, then the application interface sends those requests over the already open connection.

The method begins, in block 502, when a request is available to send to a particular server. As described previously, the request could be a multiplexed set of requests, in one embodiment. In such an embodiment, multiple applications running on the same client computer could have their requests to the same server multiplexed and sent over a single connection. Alternatively, the request could be a single request from an application program.

Using standard techniques, the application interface opens a connection with the server, in block 504, and authentication information is sent across the connection. In one embodiment, the information is cached for a timeout period so that the information is not required every time the connection with that server is opened. In another embodiment, the authentication information is cached across all requests that are exchanged while the connection is open. In block 506, the application interface sends the request to the server over the open connection. Eventually, a reply to the request will be received, in block 508.

At that time, the application interface initializes and starts or re-starts a timer, in block 509. In various embodiments, the timer could be implemented as a thread, a note in a queue, or in a number of other ways that would be apparent to one of skill in the art based on the description herein. Essentially, the timer is used to track the amount of time that the connection is inactive (i.e., no requests or replies are being sent over the connection). In another embodiment, the timer could be initialized and started upon opening the connection, and the timer would indicate how long that server connection has been open.

A determination is then made, in block 510, whether another request destined for the same server has been received from some element of client code. If so, the application interface sends the request, in block 506, and the method iterates as shown in FIG. 5.

If another request has not yet been made, a determination is made, in block 512, whether the timer has reached a connection timeout value. In one embodiment, the connection timeout value is a value that indicates the maximum amount of time that the application interface will hold a server connection open without any request or reply being sent over the connection. In one embodiment, the connection timeout value is a static value that is set by an administrator. In an alternate embodiment, the connection timeout value can be a dynamic value that is inversely proportional to the amount of server traffic, or some other variable. In another embodiment, the timeout value can be used to determine whether the connection has been held open for some period of time from the time the connection was initially opened.

If, in block 512, the timer has not yet reached the connection timeout value, then the method iterates as shown in FIG. 5. If the timer has reached the connection timeout value, indicating that the timeout period has expired, then the application interface closes the connection, in block 514, and the method ends.

By holding each server connection open for at least the connection timeout value from the last received reply, some of the advantages of both a connectionless and connection-full protocol are achieved, while avoiding many of the disadvantages. Specifically, the client does not use an undue amount of server resources during times when the connection is idle. Although the client may use a small amount of server resources during an idle time, this is limited by the fact that the connection is terminated if the connection is idle for too long. In addition, if the client is sending requests to the server with sufficient frequency, it is not necessary to set up and terminate the connection for each request, nor is it necessary to re-send authentication information across the connection.

Figure 6:
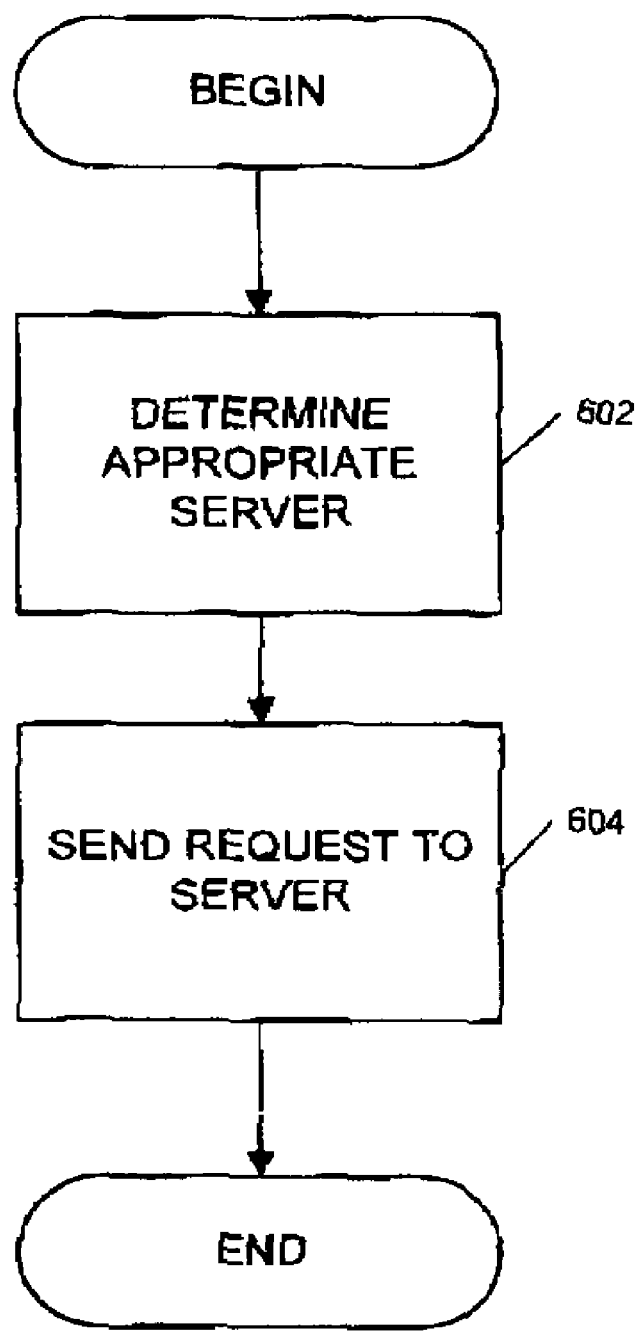
FIG. 6 illustrates a flowchart of a method for an application interface to redirect requests in accordance with one embodiment of the present invention.

As described previously in conjunction with block 418 of FIG. 4, in one embodiment, the application interface also serves the function of redirecting requests without involving the application program that initiated the request. FIG. 6 illustrates a flowchart of a method for an application interface to redirect requests in accordance with one embodiment of the present invention. The method begins after a client has received a reply from the server that includes a redirect request. Generally the redirect request will indicate that another server is the correct destination for the request.

In block 602, the application interface determines the correct server from the redirect request. In one embodiment, the correct server information is stored or cached, so that similar requests which use the same resource can be sent to the correct server initially.

The client then sends the original request to the correct server in block 604. The request is sent without involving the application program that originally generated the request. This means that the application programs which communicate with the application interface need not include the capability to handle redirect requests. In one embodiment, the application interface stores or caches the redirect information so that subsequent similar requests from application programs can immediately be directed to the correct server.

In one embodiment, the request is sent to the server using the semi-connectionless protocol described in conjunction with FIG. 5. In addition, the application interface may pool and multiplex the request with other requests destined for that same server, in one embodiment. After sending the redirected request, the method ends. The client will then eventually receive a reply, as shown in block 414 of FIG. 4, and the method will iterate as shown in FIG. 4.

FIGS. 4-6 illustrated the functionality provided by an application interface in accordance with one embodiment. This functionality includes the ability to support transactions in the communication between the client and the server. In one embodiment, that support of transactions involves both the client and the server. The application interface is responsible for assigning a transaction ID to each transaction, assigning a sequence indicator to each request within a transaction, and formatting and sending the associated request messages. The server is responsible for receiving the messages, and for placing each request in the proper sequence within a given transaction. In addition, the server is responsible for carrying out the transaction requests while guaranteeing the atomicity and isolation of the associated changes, where the isolation depends on the user-specified or agreed upon isolation level. Finally, as is explained in more detail below, the server maps client-assigned transaction IDs to internal IDs or the identities of associated database connections, if they are different.

Figure 7:
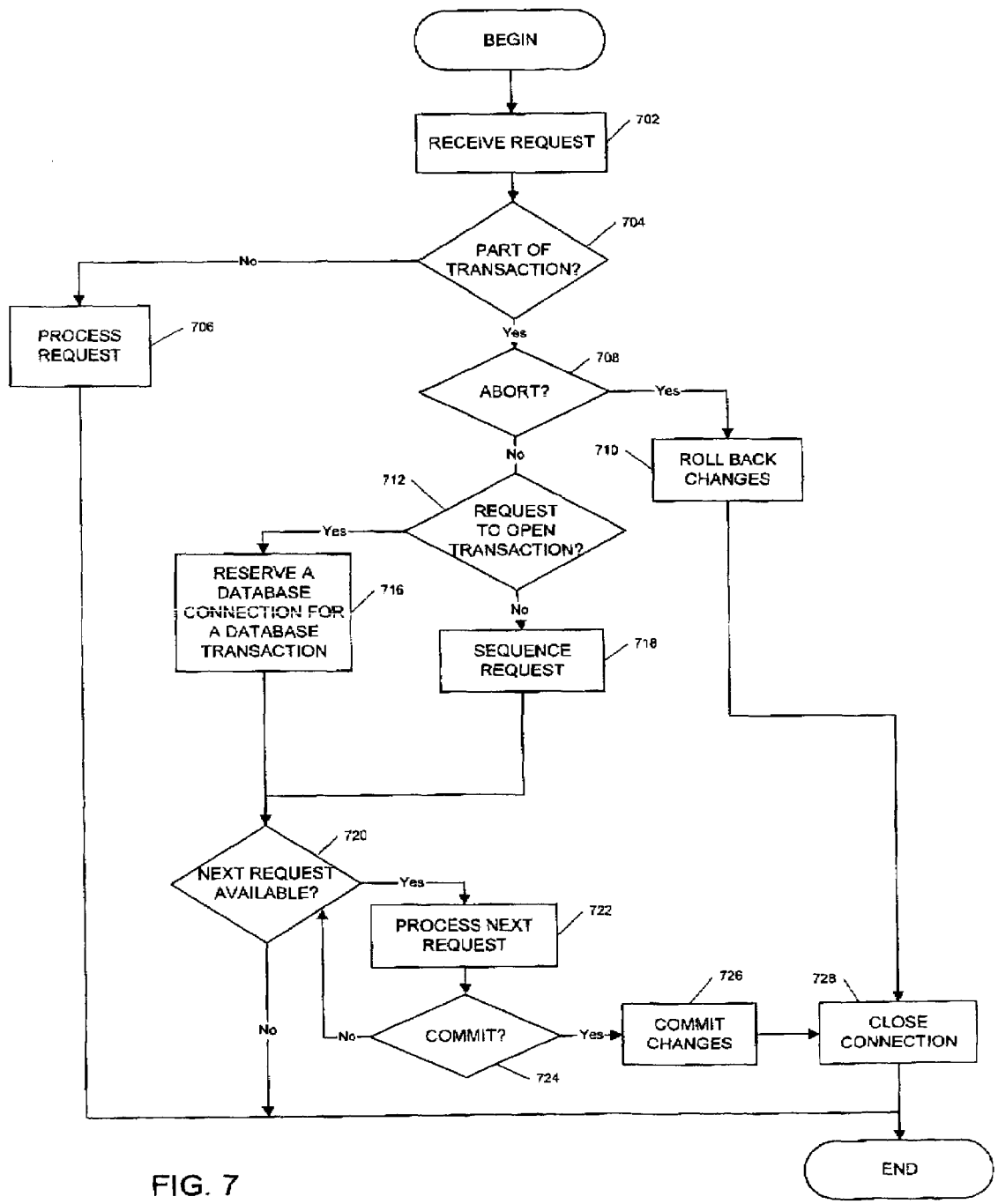
FIG. 7 illustrates a flowchart of a method for processing a trans action by a server in accordance with one embodiment of the present invention.

FIG. 7 illustrates a flowchart of a method for processing a transaction by a server in accordance with one embodiment of the present invention. As described previously in conjunction with blocks 404 and 406 of FIG. 4, each time a client requests a new transaction, the client interface assigns a transaction ID to the transaction. In addition, the client interface associates the transaction ID with each request that forms a part of the transaction, and associates a sequence indicator that indicates where each request fits within the sequence of the transaction. Each request that corresponds to the transaction must include the transaction ID and the sequence indicator in order to be processed in the transaction's atomic context. These requests are received by the server.

The transaction processing method begins, in block 702, when a request is received by the server. The request may or may not be part of a transaction. Therefore, in block 704, a determination is made whether the request is part of a transaction. This is performed by determining whether the request message includes a transaction ID. If the request is not part of a transaction, the request is processed, in block 706, atomically as usual, and the method ends.

If the request is part of a transaction, then a determination is made, in block 708, whether the request indicates that the transaction should be aborted. If so, then the changes that had been made within the context of the transaction are rolled back, in block 710. This appears to the server and, if appropriate the database, as if the transaction had never occurred. If the transaction involved a database, and the database requires dedicated connections, then the transaction manager invokes the database manager to close the database connection dedicated to the transaction, in block 728, or to deallocate the connection, if appropriate. Regardless of whether the database connection is closed or not, the connection between the server and the application interface may not be closed, in one embodiment. The method then ends.

If the request is not a request to abort the transaction, a determination is made, in block 712, whether the request indicates that a transaction should be opened. In one embodiment, an explicit "begin transaction" request is sent from the client, indicating that the server should open a transaction. The begin transaction request would include the client-assigned transaction ID. In one embodiment, this request would have the lowest sequence number (e.g., "1").

In another embodiment, an explicit "begin transaction" request may not be sent. Instead, a request that includes a new transaction ID and having the lowest possible sequence number would imply that a new transaction should be opened. Therefore, the determination of block 712 can be made, in one embodiment, by determining whether the sequence number is the lowest possible sequence number, and whether the request includes a new transaction ID. Alternatively, this determination could be made by evaluating a request type indicator or the request specific data in the received request message. In one embodiment, a request that initiates a transaction may specify the user's desired isolation level for the transaction.

If the request is a request to open a transaction, the transaction will require access to a database, and the particular database requires a dedicated connection per transaction, then in block 716, the transaction manager asks the database manager to reserve a connection (e.g., connection 318, FIG. 3) for the transaction with the appropriate database. Since very few databases are able to process more than one transaction over a single connection, the reserved database connection is allocated only to that transaction for the duration of the transaction, in one embodiment. Reserving a database connection is described in more detail in conjunction with FIG. 8, below. In another embodiment, the database connection is not reserved until the first database operation is requested. If the request is not a request to open a database connection, then the transaction manager sequences the request, in block 718. As described previously, requests within the context of a transaction can arrive at the server out of order. This is possible because, in a multi-threaded operating system, two separate requests could come from two separate threads. Alternatively, multiple servers may be participating in the same transaction.

Since requests within the context of a single transaction may be received out of order, in one embodiment, each request includes a sequence indicator, which indicates in what sequence the requests should be processed. In one embodiment, the transaction manager maintains a queue for each transaction, which the transaction manager uses to sequence the transactions request. Each time the transaction manager receives a transaction request, the transaction manager examines the sequence indicator, and places the request in a queue location that corresponds to the sequence indicator. For example, a server may receive the third, fifth, and second requests, in that order. The transaction manager would place the third request in the third queue location, the fifth request in the fifth queue location, and the second request in the second queue location. In one embodiment, the transaction manager sequences request within a transaction in this manner.

In one embodiment, the transaction manager does not sequence the request to open the transaction (i.e., the initial request within the transaction). This is because the request to open the transaction should always be executed first, it is not essential that it be placed on the transaction queue. In another embodiment, the request to open the transaction is placed on the transaction queue.

In still another embodiment, the transaction manager does not use a transaction queue to sequence received requests. Instead, the transaction manager simply stores requests that cannot be immediately executed, and executes those stored requests when they are next in the sequence.

After sequencing a request in block 718 or after reserving a database connection, if necessary, in block 716, the transaction manager determines whether the next request in the sequence is available, in block 720. For example, if the next request that should be executed is the second sequential request, the transaction manager determines if the second request has been placed on the transaction queue. If the next request is not available, then the transaction manager waits for another request to be received, and the method iterates as shown in FIG. 7.

If the next request is available, then the transaction manager takes that request off the transaction queue, and processes the request, in block 722. In one embodiment, processing the request would happen immediately. In another embodiment, the next available request is re-queued to the server's work queue.

As described previously, a request could be a request to perform any of a variety of different services, such as authenticating a user, providing access to files or data, sending or receiving email, or providing Web access, for example. If the request involves a database operation, processing the request may involve invoking the database manager to send a request for data to the appropriate database over the transaction's dedicated database connection, for example. Alternatively, the next request may be a request to commit or abort the transaction.

A determination is made, in block 724, whether the request is a request to commit the transaction. If so, then the transaction manager commits the changes to the database, in block 726. The transaction being completed, the transaction manager then invokes the database manager to close the dedicated connection, if necessary, in block 728, and the method ends. In an alternate embodiment, the database connection can remain open, but it is deallocated (i.e., freed to be used for a subsequent action or transaction).

If the request is not a request to commit, then the transaction is not completed, and the method returns to the determination of whether the next request is available on the queue, in block 720. The method then iterates as shown in FIG. 7, sequentially executing each request on the transaction queue until a break in the sequence is encountered, or the transaction is committed or aborted. Occasionally, as described above and as illustrated in FIG. 7, the transaction manager must wait for a request within the sequence before processing other received requests, since the requests may come into the server out of order.

As described in conjunction with block 716 of FIG. 7, the transaction manager works with the database manager to reserve a database connection for each new transaction. Some prior art servers, such as MICROSOFT IIS, include a database manager that manages a pool of open database connections, whether or not the connections in the pool have been allocated to a particular transaction. Maintaining an open pool of database connections is advantageous, in that it is not necessary to set up a connection each time the server wants to perform some database-related operation.

Connection pools are important for servers that support transactions, because very few databases allow the server to perform multiple, simultaneous, and independent transactions over the same connection. Over any given connection, only one active transaction can be performed.

In one embodiment of the present invention, a database manager maintains a pool of connections (e.g., pool 320, FIG. 3), where each connection within the pool can be reserved for a transaction. Allocating these connections to various transactions, and coordinating the transfer of requests and data over the allocated connections is performed cooperatively by the transaction manager (e.g., manager 314, FIG. 3) and the database manager (e.g., manager 316, FIG. 3).

Figure 8:
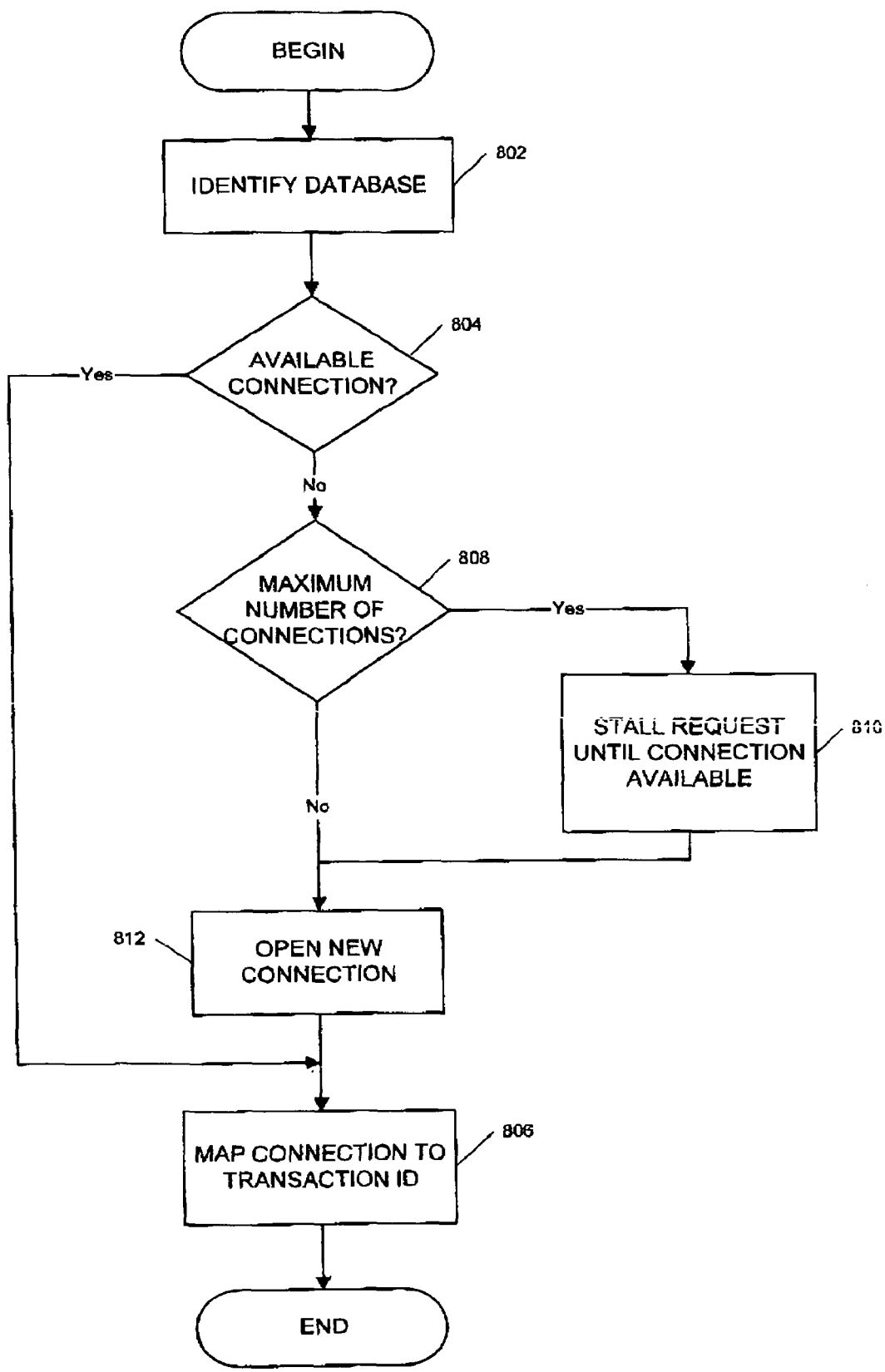
FIG. 8 illustrates a flowchart of a method for performing database connection pooling in accordance with one embodiment of the present invention.

FIG. 8 illustrates a flowchart of a method for performing database connection pooling in accordance with one embodiment of the present invention. In one embodiment, the method is performed each time a database connection needs to be reserved for a transaction, as is required in block 710 of FIG. 7.

The method begins, in block 802, by identifying the database that pertains to the data needed during the transaction. Assuming that the database is accessible to the database manager, the database manager determines, in block 804, whether a free connection is currently available. Where a 1:1 mapping exists between connections and transactions, a free connection is a connection within a pool of currently established connections that is not currently allocated to another transaction or action. If more than one transaction can be mapped to a particular connection, a free connection is a connection within the pool that has the capacity to handle another transaction. A connection to a database may be unavailable, for example, if the connection is reserved for a different transaction or if the maximum number of transactions that the pool of connections can handle has been met or exceeded. Since requests are made via a command object, connections with some databases may also be unavailable when these command objects are tied up (e.g., while partial results remain active).

If a free connection is available, then the connection is mapped to the transaction ID, in block 806. This is done, in one embodiment, by maintaining a table that associates the transaction IDs for all current transactions with a connection ID indicating which connection is allocated to each transaction. In one embodiment, the mapping of transaction ID to connection ID occurs with the first request within a transaction or with the first database operation. Assuming that the connection supports only one transaction at a time, the mapping then persists on the connection until the transaction is aborted or committed.

In one embodiment, the connection ID is an attribute of the transaction that is stored by the transaction manager. In another embodiment, the database manager and the transaction manager communicate with each other to correlate the connection ID and the transaction ID. After mapping the transaction ID to the connection, the method ends, and the connection is then reserved for all future requests within the context of that transaction.

If, in block 804, it is determined that a free connection is not available, then a determination is made, in block 808, whether the maximum number of connections to that database is already established. Generally, only a finite number of connections to a particular database can be established. The maximum number of possible connections indicates the number of connections that the particular server may have with the database at any particular time.

If the maximum number of connections has been established, then the server stalls the request, in block 810, until a connection is available. In another embodiment, the server informs the client that no connection is currently available, and the method ends. In that embodiment, the client may return that information to the client application, or may wait and re-send the request.

If the maximum number of connections has not been established or after a connection becomes available for a pending request, then the database manager opens a new connection to the database, in block 812. The new connection is then mapped to the transaction ID, in block 806, and the method ends.

The connection is then reserved for all future requests within the context of that transaction. Thus, whenever a request is received in the context of the transaction, the request is affinitized to the database connection reserved for that transaction.

CONCLUSION

Embodiments of the present invention provide a system and method that efficiently uses available bandwidth between a server and multiple clients, without requiring a connection to be established and terminated each time a message needs to be transferred. In one embodiment, this is accomplished by using a "semi-connectionless" protocol between a client and server. Embodiments of the present invention also provide a system and method that enables transactions to be implemented in the communications between a client and a server, thus enabling the client to start a transaction, request that the server perform certain operations, and commit or abort the transaction. Embodiments of the present invention also provide a system and method for a client computer to handle redirect requests without involving the associated client application.

In the foregoing detailed description, reference is made to the accompanying drawings which form a part hereof, and in which are shown by way of illustration specific embodiments in which the invention may be practiced. These embodiments are described in sufficient detail to enable those skilled in the art to practice the invention.

The foregoing detailed description uses terms that are provided in order to make the detailed description more easily understandable. It is to be understood that these terms and the phraseology employed in the description should not be construed to limit the scope of the invention.

It will be appreciated by those of ordinary skill in the art that any arrangement which is calculated to achieve the same purpose may be substituted for the specific embodiment shown. This application is intended to cover any adaptations or variations of the present invention that fall within its scope. The foregoing detailed description is, therefore, not to be taken in a limiting sense, and it will be readily understood by those skilled in the art that various changes in the details, materials, and arrangements of the parts and steps which have been described and illustrated in order to explain the nature of this invention may be made without departing from the spirit and scope of the invention as expressed in the adjoining claims.

What is claimed is:

1. A method in a computer system for performing a transaction that includes multiple requests, the method comprising:
    an application interface of a client computer receiving a request from an application program;
    the application interface associating a transaction identifier with the request, wherein the transaction identifier identifies a transaction that the request is associated with;
    the application interface forming a message including the transaction identifier and the request;
    the application interface sending the message to a server, comprising the steps of opening a connection with the server, sending the message over the connection, initializing a timer indicative of how much time has expired since a message was last sent to the server or a reply was last received from the server, determining whether a timeout period of the timer has expired before another message for the server is received from the application program or another reply is received from the server, keeping the connection open and reinitializing the timer so long as either another message for the server is received from the application program or another reply is received from the server before the timeout period has expired, and closing the connection when the timeout period has expired before either another message for the server is received from the application program or another reply is received from the server;
    the server receiving the message; and
    the server processing the request in a context of the transaction identified by the transaction identifier in the message.

2. The method as claimed in claim 1, further comprising:
    the application interface associating a sequence indicator to the request, wherein the sequence indicator indicates in what sequence the server should process the request within the context of the transaction; and
    wherein forming the message comprises including the sequence indicator in the message.

3. The method as claimed in claim 1, further comprising:
    the application interface receiving a reply from the server in response to the request;
    the application interface determining that the reply includes a redirect request that indicates that the request should be sent to another server; and
    the application interface sending the message to the another server.

4. The method as claimed in claim 1, further comprising:
    the server allocating a database connection to the transaction; and
    the server processing the requests that form a part of the transaction over the database connection allocated to the transaction.

5. The method as claimed in claim 4, further comprising:
    the application interface including a sequence indicator in the message, wherein the sequence indicator indicates in what sequence the server should process the request within the context of the transaction; and
    wherein processing the requests comprises processing the requests in an order indicated by the sequence indicator.

6. A method in a computer system for a client to perform multiple requests in the context of a transaction, the method performed by an application interface associated with the client, the method comprising:
  receiving a request from an application program;
  associating a transaction identifier with the request, wherein the transaction identifier identifies a transaction that the request is associated with;
  forming a message including the transaction identifier and the request; and
  sending the message to a server, comprising the steps of opening a connection with the server, sending the message over the connection, initializing a timer indicative of how much time has expired since a message was last sent to the server or a reply was last received from the server, determining whether a timeout period of the timer has expired before another message for the server is received from the application program or another reply is received from the server, keeping the connection open and reinitializing the timer so long as either another message for the server is received from the application program or another reply is received from the server before the timeout period has expired, and closing the connection when the timeout period has expired before either another message for the server is received from the application program or another reply is received from the server.

7. The method as claimed in claim 6, further comprising assigning the transaction identifier to the transaction if the request is a request to open a new transaction.

8. The method as claimed in claim 6, further comprising:
  associating a sequence indicator with the request, wherein the sequence indicator indicates in what sequence the server should process the request within the context of the transaction; and
  wherein forming the message comprises including the sequence indicator within the message.

9. The method as claimed in claim 6, further comprising:
  multiplexing together multiple requests that are destined for the server; and
  sending the multiple requests to the server in a multiplexed format.

10. The method as claimed in claim 6, further comprising:
  receiving a reply from the server in response to sending the message; and
  sending the reply to the application program.

11. A method in a computer system for a client to send one or more messages to a server, the method comprising:
  receiving a request from an application program;
  associating a transaction identifier with the request, wherein the transaction identifier identifies a transaction that the request is associated with;
  forming one or more messages including the transaction identifier and the request;
  opening a connection with the server;
  sending the one or more messages over the connection;
  initializing a timer indicative of how much time has expired since a message was last sent to the server or a reply was last received from the server;
  determining whether a timeout period of the timer has expired before another message for the server is received from an application program of the client or another reply is received from the server;
  keeping the connection open and reinitializing the timer so long as either another message for the server is received from the application program or another reply is received from the server before the timeout period has expired; and
  closing the connection when the timeout period has expired before either another message for the server is received from the application program or another reply is received from the server.

12. The method as claimed in claim 11, wherein determining whether the timeout period has expired comprises comparing a value of the timer to the timeout period.

13. The method as claimed in claim 11, further comprising:
  receiving another request destined for the server within the timeout period; and
  sending the another request to the server over the connection.

14. A computer system for processing requests from application programs, the computer system comprising:
  a processor for executing an application interface which receives requests destined for the server from at least one application program, associates transaction identifiers with each of the requests that are associated with transactions, and forms messages including the transaction identifiers and the requests; and
  an interface to the server, coupled to the processor through a bus, which sends the messages to the server by opening a connection with the server, sending the messages over the connection, initializing a timer indicative of how much time has expired since a message was last sent to the server or a reply was last received from the server, determining whether a timeout period of the timer has expired before a subsequent message for the server is received from the at least one application program or another reply is received from the server, keeping the connection open and reinitializing the timer so long as either another message for the server is received from the at least one application program or another reply is received from the server before the timeout period has expired, and closing the connection when the timeout period has expired before either another message for the server is received from the at least one application program or another reply is received from the server.

15. The computer system as claimed in claim 14, wherein the processor is further for associating sequence indicators with the requests, wherein the sequence indicators indicate the order that the requests within a transaction should be performed by the server.

16. A computer system for processing requests from application programs, the computer system comprising:
  a processor for executing an application interface which receives requests destined for a server from at least one application program, wherein the processor opens a connection with the server, sends one or more messages over the connection, initializes a timer indicative of how much time has expired since a message was last sent to the server or a reply was last received from the server, determines whether a timeout period of the timer has expired before another message for the server is received from the at least one application program or another reply is received from the server, keeps the connection open and reinitializes the timer so long as either another message for the server is received from the at least one application program or another reply is received from the server before the timeout period has expired, and closes the connection when the timeout period has expired before either another message for the server is received from the at least one application program or another reply is received from the server; and
  an interface to the server, coupled to the processor through a bus, which receives a request from an application program, associates a transaction identifier with the request, wherein the transaction identifier identifies a transaction that the request is associated with, forms one or more messages including the transaction identifier and the request, and sends the one or more messages to the server for processing of the request in a context of the transaction identified by the transaction identifier in the one or more messages.

17. The computer system as claimed in claim 16, wherein the processor is further for sending one or more additional requests destined for the server over the connection during the timeout period.

18. A computer-readable medium holding computer executable instructions, the computer-readable medium for performing a method in a computer system for a client to perform multiple requests in the context of a transaction, the method performed by an application interface associated with the client, the method comprising:

receiving a request from an application program;

associating a transaction identifier with the request, wherein the transaction identifier identifies a transaction that the request is associated with;

forming a message including the transaction identifier and the request; and sending the message to a server, comprising the steps of opening a connection with the server, sending the message over the connection, initializing a timer indicative of how much time has expired since a message was last sent to the server or a reply was last received from the server, determining whether a timeout period of the timer has expired before another message for the server is received from the application program or another reply is received from the server, keeping the connection open and reinitializing the timer so long as either another message for the server is received from the application program or another reply is received from the server before the timeout period has expired, and closing the connection when the timeout period has expired before either another message for the server is received from the application program or another reply is received from the server.

19. A computer-readable medium holding computer executable instructions, the computer-readable medium for performing a method in a computer system for a client to send one or more messages to a server, the method comprising:

receiving a request from an application program;

associating a transaction identifier with the request, wherein the transaction identifier identifies a transaction that the request is associated with;

forming one or more messages including the transaction identifier and the request;

opening a connection with the server;

sending the one or more messages over the connection;

initializing a timer indicative of how much time has expired since a message was last sent to the server or a reply was last received from the server;

determining whether a timeout period of the timer has expired before another message is received for sending to the server or another reply is received from the server;

keeping the connection open and reinitializing the timer so long as either another message for the server is received or another reply is received from the server before the timeout period has expired; and closing the connection when the timeout period has expired before either another message for the server is received or another reply is received from the server.

* * * * *